United States Patent
Ozcan et al.

(10) Patent No.: US 12,406,172 B2
(45) Date of Patent: Sep. 2, 2025

(54) COMPUTATIONAL METHOD FOR FEEDBACK IN A HIERARCHICAL NEURAL NETWORK

(71) Applicant: INTERNATIONAL BUSINESS MACHINES CORPORATION, Armonk, NY (US)

(72) Inventors: Ahmet S. Ozcan, San Jose, CA (US); J. Campbell Scott, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 15/691,103

(22) Filed: Aug. 30, 2017

(65) Prior Publication Data
US 2019/0065935 A1  Feb. 28, 2019

(51) Int. Cl.
*G06N 3/049* (2023.01)
*G06N 3/045* (2023.01)

(52) U.S. Cl.
CPC ............. *G06N 3/049* (2013.01); *G06N 3/045* (2023.01)

(58) Field of Classification Search
CPC .. G06N 3/0454; G06N 3/0445; G06N 3/0472; G06N 3/049
See application file for complete search history.

(56) References Cited

U.S. PATENT DOCUMENTS

| | | | | |
|---|---|---|---|---|
| 7,983,998 B2 * | 7/2011 | George | ................ | G06N 3/049 706/12 |
| 8,285,667 B2 * | 10/2012 | Jaros | ..................... | G06N 7/01 706/50 |
| 8,775,341 B1 * | 7/2014 | Commons | ......... | G06F 16/3344 706/20 |
| 9,390,372 B2 | 7/2016 | Modha | | |

(Continued)

FOREIGN PATENT DOCUMENTS

| | | |
|---|---|---|
| CN | 1212772 A | 3/1999 |
| CN | 103455843 A | 12/2013 |

(Continued)

OTHER PUBLICATIONS

Kneller, et al., "Distal dendrite feedback in hierarchical temporal memory." 2015 International Joint Conference on Neural Networks (IJCNN). IEEE, 2015 (Year: 2015).*

(Continued)

*Primary Examiner* — Michael J Huntley
*Assistant Examiner* — Adam C Standke
(74) *Attorney, Agent, or Firm* — Erik A. Huestis; Katherine L. Baker; Foley Hoag LLP (57) ABSTRACT

Feedback within hierarchical neural networks such as hierarchical temporal memories is provided. In various embodiments, a plurality of input streams is received at a first region of a hierarchical artificial neural network. The plurality of input streams is pooled in the first region. One or more recurrent features are identified in the pooled input streams in the first region. A temporal pattern is recognized in the one (Continued)

or more recurrent features in the first region. An indication of the temporal pattern is provided to at least a second region of the hierarchical neural network. A response to a further input is modulated based on feedback from the second region and at least one additional region.

24 Claims, 7 Drawing Sheets

(56) References Cited

U.S. PATENT DOCUMENTS

| | | | |
|---|---|---|---|
| 10,395,118 B2* | 8/2019 | Yu | G06N 3/044 |
| 2006/0184462 A1* | 8/2006 | Hawkins | G06N 7/01 |
| | | | 706/14 |
| 2009/0006289 A1 | 1/2009 | Jaros et al. | |
| 2009/0240639 A1 | 9/2009 | George et al. | |
| 2011/0225108 A1 | 9/2011 | Hawkins et al. | |
| 2013/0297539 A1 | 11/2013 | Piekniewski et al. | |
| 2014/0089232 A1 | 3/2014 | Buibas et al. | |
| 2015/0324655 A1* | 11/2015 | Chalasani | G06V 10/764 |
| | | | 382/103 |

FOREIGN PATENT DOCUMENTS

| | | |
|---|---|---|
| CN | 105095961 A | 11/2015 |
| CN | 111052150 A | 4/2020 |
| EP | 0877984 B1 | 5/2000 |
| JP | 2020-532013 A | 11/2020 |
| WO | 2019/042676 A1 | 3/2019 |

OTHER PUBLICATIONS

George et al., "Towards a mathematical theory of cortical microcircuits." PLoS computational biology 5.10 (Year: 2009).*
Wielgosza et al., "Noisy video classification with Spatial Pooler of Hierarchical Temporal Memory." brain 3 (Year: 2016).*
Kneller, et al., "Distal dendrite feedback in hierarchical temporal memory." 2015 International Joint Conference on Neural Networks (IJCNN). IEEE (Year: 2015).*
Byrne, Fergal. "Encoding reality: prediction-assisted cortical learning algorithm in hierarchical temporal memory." arXiv preprint arXiv:1509.08255 (Year: 2015).*
Hashmi et al. "Discovering Cortical Algorithms." IJCCI (ICFC-ICNC) (Year: 2010).*
Alonso et al., "Thalamus controls recurrent cortical dynamics," Nat Neurosci, 18(12):1703-1704 (2015).
Chung et al., "Gated feedback recurrent neural networks," (2015).
Fast Simulation with Multiple Multi-Layer Neural Networks, IP.com No. IPCOM000247603D, Sep. 19, 2016.
Felleman et al., "Distributed hierarchical processing in the primate cerebral cortex," Cereb Cortex, 1(1):1-47 (1991).
Hawkins et al., "Biological and Machine Intelligence (BAMI)," Numenta, Inc., pp. 1-69, (2016).
Hebb: The Organization of Behavior, Wiley: New York; 1949.
Kawato et al., "A hierarchical neural-network model for control and learning of voluntary movement," Biol Cybern, 57(3):169-185 (1987).
Machine Learning Algorithms for Smart Meter Diagnostics, IP.com No. IPCOM000242462D, Jul. 16, 2015.
Stollenga et al., "Deep networks with internal selective attention through feedback connections," Adv Neur In, pp. 3545-3553 (2014).
George et al., "Invariant Pattern Recognition using Bayesian Inference on Hierarchical Sequence," Retrieved from Internet, URL:http://www.cnbc.cmu.edu/cns/papers/DilJeffTechReport.pdf [retrieved on Oct. 29, 2018].
Hawkins et al., "Hierarchical Temporal Memory Concepts, Theory, and Terminology," Numenta Inc., pp. 1-20 (2006).
International Search Report and Written Opinion for International Application No. PCT/EP2018/070509 dated Oct. 15, 2018.
Yeap et al., "A Hierarchical Neural Network for Temoral Pattern Recognition," IEEE International Symposium on Circuits and Systems,4:2967-2970 (1990).
Notice of Reasons for Refusal for JP Application No. 2020-511783 dated May 27, 2022.
English Translation of Notice of Reasons for Refusal for JP Application No. 2020-511783 dated Nov. 24, 2021.
Office Action for Chinese Patent Application No. 201880054348.5 dated Feb. 2, 2023.
Chinese Office Action for 201880054348.5 dated Sep. 23, 2023.

* cited by examiner

COMPUTATIONAL METHOD FOR FEEDBACK IN A HIERARCHICAL NEURAL NETWORK

This invention was made with Government support under contract number N66001-15-C-4034 awarded by the Defense Advanced Research Projects Agency (DARPA) and the Space and Naval Warfare Systems Center Pacific (SSC Pacific). The Government has certain rights to this invention.

BACKGROUND

Embodiments of the present disclosure relate to artificial neural networks, and more specifically, to providing feedback within hierarchical neural networks such as hierarchical temporal memories.

BRIEF SUMMARY

According to embodiments of the present disclosure, systems for, methods of, and computer program products for providing feedback within an artificial neural networks are provided. A plurality of input streams is received at a first region of a hierarchical artificial neural network. The plurality of input streams is pooled in the first region. One or more recurrent features are identified in the pooled input streams in the first region. A temporal pattern is recognized in the one or more recurrent features in the first region. An indication of the temporal pattern is provided to at least a second region of the hierarchical neural network. A response to a further input is modulated based on feedback from the second region and at least one additional region.

According to some embodiments of the present disclosure, a hierarchical artificial neural network is provided. The network includes a plurality of regions. Each region comprises a pooler, a correlator, a sequence memory, and at least one connection to another of the plurality of regions. The hierarchical artificial neural network is configured to: receive a plurality of input streams at a first region of the plurality of regions; pool the plurality of input streams at the pooler of the first region; identify one or more recurrent features in the pooled input streams at the correlator of the first region; recognize a temporal pattern in the one or more recurrent features at the sequence memory of the first region; provide to at least a second region of the plurality of regions an indication of the temporal pattern; and modulate a response to a further input to the first region based on feedback from the second region and at least one additional region of the plurality of regions.

In some embodiments, systems for, methods of, and computer program products for providing feedback within an artificial neural networks are provided. A stable representation is formed within a second region of a hierarchical artificial neural network based on input to the hierarchical artificial neural network. One or more recurrent features is identified in an input stream in a first region of the hierarchical artificial neural network. A temporal pattern is recognized in the one or more recurrent features in the first region. An indication of the temporal pattern is provided to at least a second region of the hierarchical neural network. A response to a further input to the first region is modulated based on feedback indications from the second region and at least one additional region based on the stable representation.

DETAILED DESCRIPTION

In the mammalian brain, the cortex is inter-connected as a hierarchical neural network. The firing of neurons in regions lower in the hierarchy stimulates neurons to fire in the next highest region, in a feed-forward process. In contrast, activity in higher regions may modulate the firing behavior in any lower region. This behavior facilitates top-down control, stabilization, directed attention, and other functions. Conventional artificial neural networks lack a mechanism to provide such diverse forms of feedback.

As an example of feedback, stimulus from the retina of each eye passes through the optic nerve, via the thalamus to the lowest sensory regions (V1, V2) of the visual cortex. It is processed in those layers to identify very simple shapes, such as lines and edges. The resulting patterns of neuron activity provide representations for these primitive shapes, which are passed on to the next highest regions in the hierarchy (V3, V3A). These layers pool and correlate the input and form representations of more complex shapes. This feed-forward processing proceeds up the cortical hierarchy until representations of objects, people, places, etc. emerge in the parietal lobes. Increasingly richer representations are formed as the data are fed forward through the hierarchy.

Higher level representations change more slowly than those at lower levels. In V1 and V2, for example, the neural patterns change on time scales comparable to the response of rods and cones in the retina (10-100 milliseconds). In the anterior intraparietal region (AIP), in contrast, the representation of a recognized object remains essentially unchanged while the object is in view, and even after it is no longer visible.

Such stable representations provide the basis for feedback from higher levels to lower ones. For example, where only part of an object is in the field of view, lower regions may not have sufficient information to make a complete identification. However, higher regions can respond to just the visible parts of the object, associating the partial representation with other views of similar objects that have been seen and learned previously. In this way, higher levels can complete a partial picture to make an identification. That knowledge and context, in the form of the stable representation, is fed back to a lower region. In this way, the lower levels need not collect further information about the details of the object.

As noted above, conventional artificial neural networks lack the necessary architecture to provide this kind of over-ride and control from upper levels to lower. In particular, conventional artificial neural networks do not provide for the feedback of context in the form of a semantic representation to lower levels.

Figure 1:
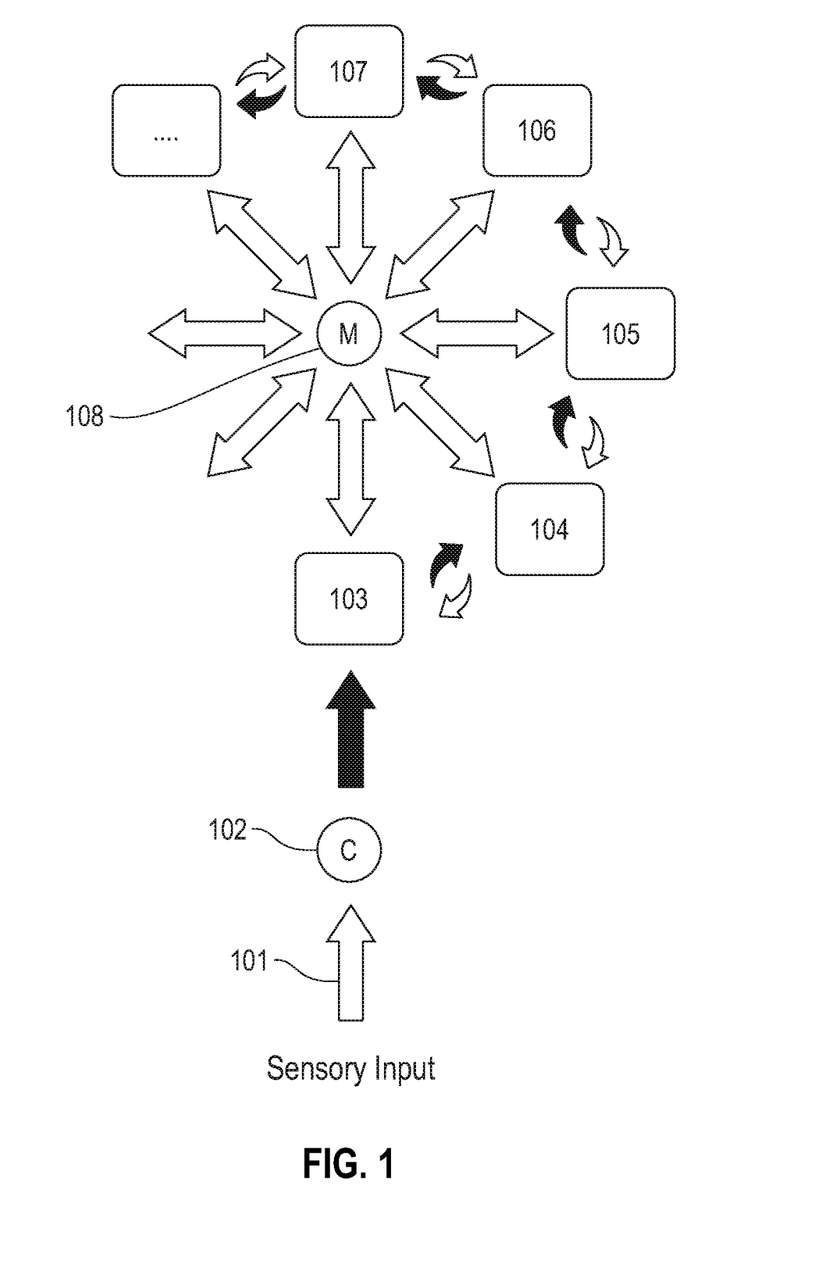
FIG. 1 depicts feedback within the cortex to illustrate the context of the present disclosure.

Referring now to FIG. 1, feedback within the cortex and the role of the thalamus is illustrated. Sensory input 101 is provided to core cells 102 of the thalamus. Data progresses up the regions 103 ... 107 ... of the cortex. Adjacent levels have direct feed-forward, and generally direct feedback. The thalamus matrix cells 108 provide a feedback pathway from any higher level region to those below.

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

Other algorithms employ Hebbian learning rules and do not require the generation of an error function based on ground-truth data. Instead, patterns and temporal sequences produce neural firing patterns that either generate new synapses or reinforce existing synapses. In this way, such systems learn continuously and spontaneously to recognize and predict commonly occurring associations and sequences.

The present disclosure provides for feedback within artificial neural networks. When a region of the hierarchy receives feed-forward data that it has seen before and has learned to recognize as a familiar sequence, it generates a stable representation of that sequence. Embodiments of the present disclosure use that representation as feedback via axons from the upper region to apical synapses of lower levels. If some neurons of the lower level subsequently fire, then the connecting synapses are strengthened, for example by the Hebbian learning rule. Likewise, connecting synapses may be weakened if the pre-synaptic or post-synaptic neuron does not fire. In this way, upper level activity denotes context and connected apical synapses allow the prediction of which lower-level neurons will fire next. By sustaining the predicted firing, systems according to the present disclosure are able to overcome noise (e.g., missing or bad data) in the input data stream.

Figure 2:
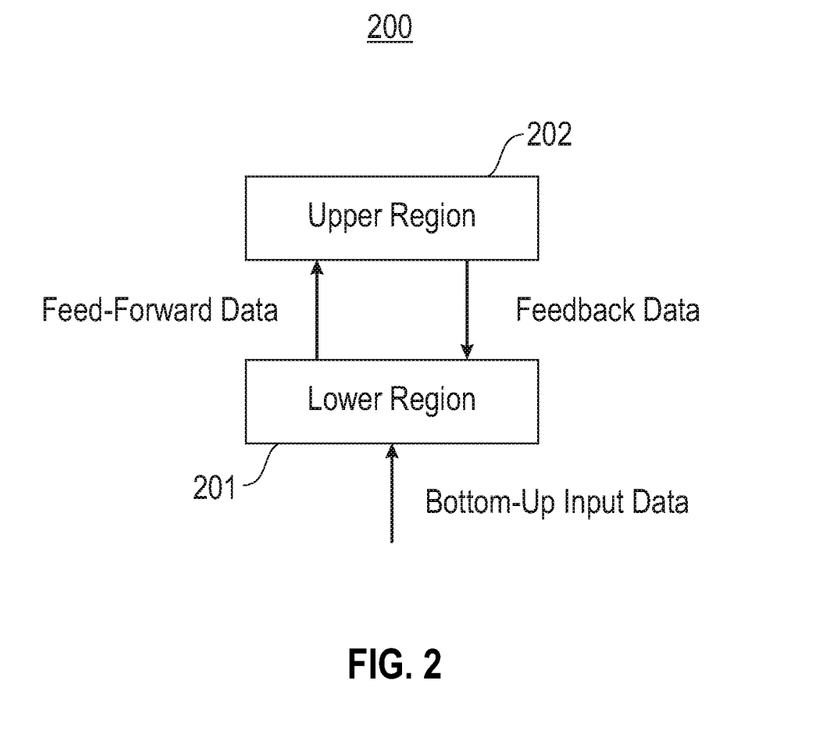
FIG. 2 illustrates the regions of an exemplary hierarchical neural network according to embodiments of the present disclosure.

Referring now to FIG. 2, an exemplary two region hierarchical neural network is depicted. For simplicity, various embodiments are described herein relative to two regions in a hierarchical neural network. However, it will be appreciated that the present disclosure is applicable to networks with any number of regions. In network 200, a lower region 201 receives input from other regions below or from sensors. An upper region 202 receives data fed forward from the lower region 201. This relationship between the two regions is generalizable to multiple regions on multiple levels. For example, in various embodiments, a first lower region receives feedback from one or more upper regions.

In various embodiments described further below, the formation of stable representations in an upper region of a neural network is identified. The stable representation is passed to modulating synapses of a lower region. Such synapses may be referred to as apical synapses. If sufficient apical synapses are active, the neuron to which they connect is put into a sustain mode. Various exemplary embodiments provided herein are described in terms of a binary neural network, e.g., one in which data propagates between regions in the form of binary vectors. However, it will be appreciated that the subject matter of the present disclosure is applicable to other hierarchical neural networks.

Figure 3:
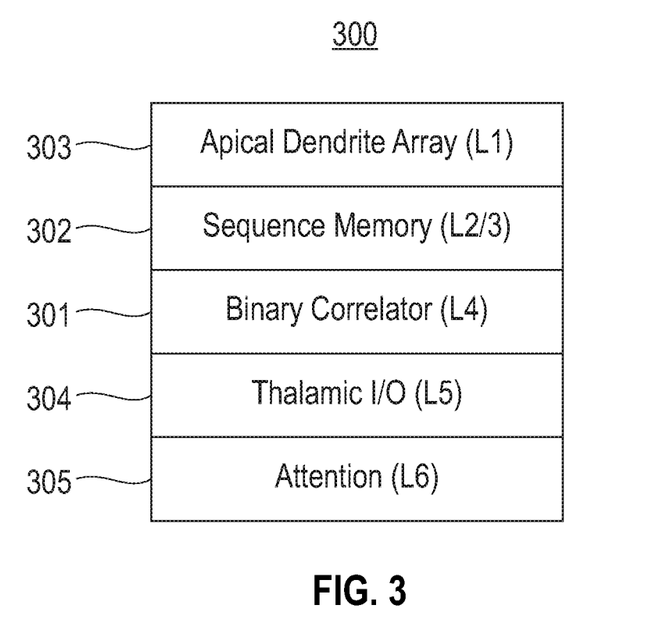
FIG. 3 illustrates the component parts of a cortical region of an exemplary hierarchical neural network according to embodiments of the present disclosure.

Referring now to FIG. 3, the component parts of a cortical region and their corresponding neurological equivalents are illustrated. Each region in the hierarchy of a neural network consists of several component parts. In various embodiments described herein, they are designed to emulate the 6 layers of the cortical sheet. However, it will be appreciated that this is merely an illustrative example, and that present disclosure is applicable to any number of layers.

In region 300, a first part 301 receives data fed forward from regions below, pooling and correlating multiple input data streams. This may be referred to as the correlator, which in this example is binary. Its role is analogous to the basal synapses of the layer 4 (L4) neurons in the mammalian cortex. The inputs to the correlator change, in general, on every time-step. If an L4 neuron fires through basal activity, it activates one or more neurons in its mini-column. The term mini-column reflects the physical arrangement of L4 and layers L2/3 302.

In various embodiments of a binary network, the firing pattern is represented as a binary vector, with the on-bits (1s) indicating active neurons. The columns form the second component of the region, sequence memory 302. Extensive lateral connections (or synapses) are provided among the L2/3 neurons. By Hebbian strengthening and weakening of the lateral synapses, the L2/3 activity pattern for each input modulates the firing behavior at the next input. These lateral connections are modulating, that is they do not cause actual firing, but they predict which neurons will fire next, in a mechanism that is analogous to biological depolarization. If the column with predicted neuron(s) does indeed become active on the next input, then only the predicted neuron(s) fire, and the synapses responsible for their prediction are strengthened. If the predicted neurons are not in a newly active column, their synapses are weakened. The now active neurons, in turn, make further predictions for the input at the following time-step. By this means, the system learns sequences of inputs. The L4 neurons and their activated columns encode the correlated input values. The particular active neuron in that column encodes the context of the input, e.g., the sequence prior values which led up to the current input.

When a neuron that was predicted by the previous input is activated by the current input (the predicted neuron is verified), its active state is fed forward to one or more upper regions. This feed-forward signal, represented again by a binary vector, also changes from time-step to time-step. When a sequence has been learned, each step is correctly predicted, and the output contains information about the particular neurons that fired in the context of the preceding data.

One of the limitations of sequence memory that operates in the manner described above is that it does not tolerate the presence of noise well. Noise may take the form of missing or erroneous data that interrupt an otherwise learned sequence. In addition, such systems are not able to generalize well. They are unable to predict on the basis of something similar to what they have seen before, as opposed to something seen exactly. The difference between exact and similar may be considered a form of noise.

The present disclosure provides mechanisms for feedback whereby regions in upper levels of the hierarchy modulate the activity of lower regions to override noisy input data. A stable, slowly varying, representation is formed in the upper region. The stability of the representation is identified and assured in the case of a binary network by calculating the logical AND of the bits in two or more successive outputs of the upper level layer-4 neurons (L4'). In analog networks, stability is measured by a small (square or absolute) difference between the output representations.

The stable representation is routed to the apical synapses of the L4 neurons in the lower region. As with the correlator and sequence memory, the array of apical synapses is represented as a matrix, with rows being the inputs (axons) and columns the output (dendrites). The strength of each synapse is stored in the analog permanence matrix. The binary connectivity matrix is obtained by comparing each permanence with a threshold value. If the permanence is above a threshold, the synapse is connected (binary value 1), otherwise not (binary value 0).

The activity of the apical dendrites 303 is determined by calculating the matrix product of the connectivity matrix and the feedback vector. The resulting integer values measure the overlap of active axons with connected synapses. Sufficient excitation, as determined by overlap of greater than a threshold value, of the apical synapses causes the L4 neuron to fire, regardless of the state of its basal synapses. It will be appreciated that the threshold value may be floating. Such a neuron can be said to be in a sustained state. As a result, even if the bottom-up input is weak or missing, that mini-column is activated and the firing sequence in sequence memory can continue past the bad datum.

Finally, the strengths of the apical synapses may be updated according to the Hebb rules. If an L4' neuron fires immediately before an L4 neuron, their connecting synapse is strengthened. Any synapses on the axons of active L4' neurons that (might) connect to inactive L4 apical dendrites are weakened. In this way, the network learns which feedback representations sustain which columns in the lower region.

Figure 4:
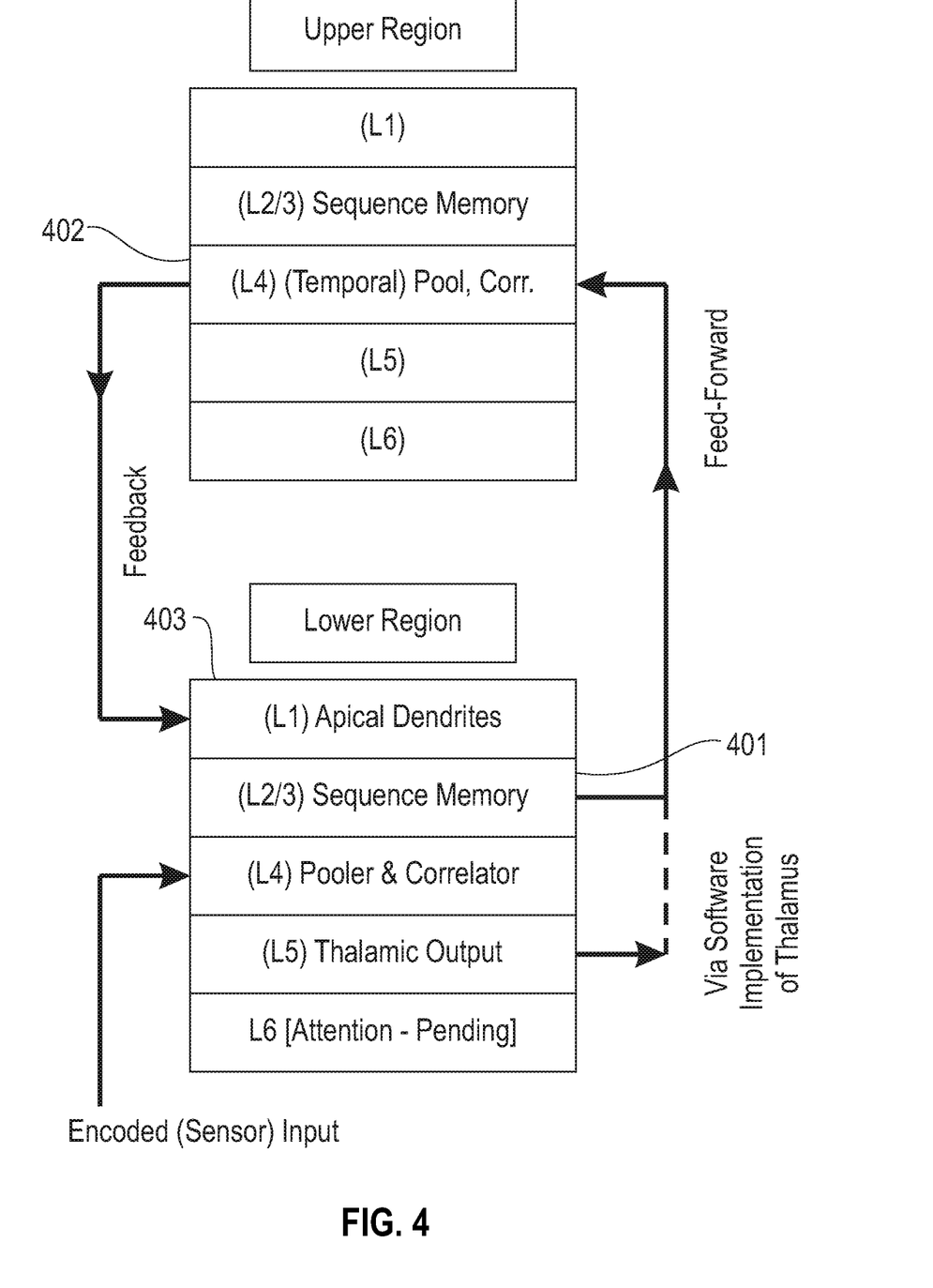
FIG. 4 illustrates flow of data between multiple regions of an exemplary artificial neural network according to embodiments of the present disclosure.

Referring now to FIG. 4, the flow of data through two exemplary regions is illustrated. As described above, data are fed forward from L2/L3 layer 401. Feedback is provided from L4 layer 402 to L1 layer 403.

Figure 5:
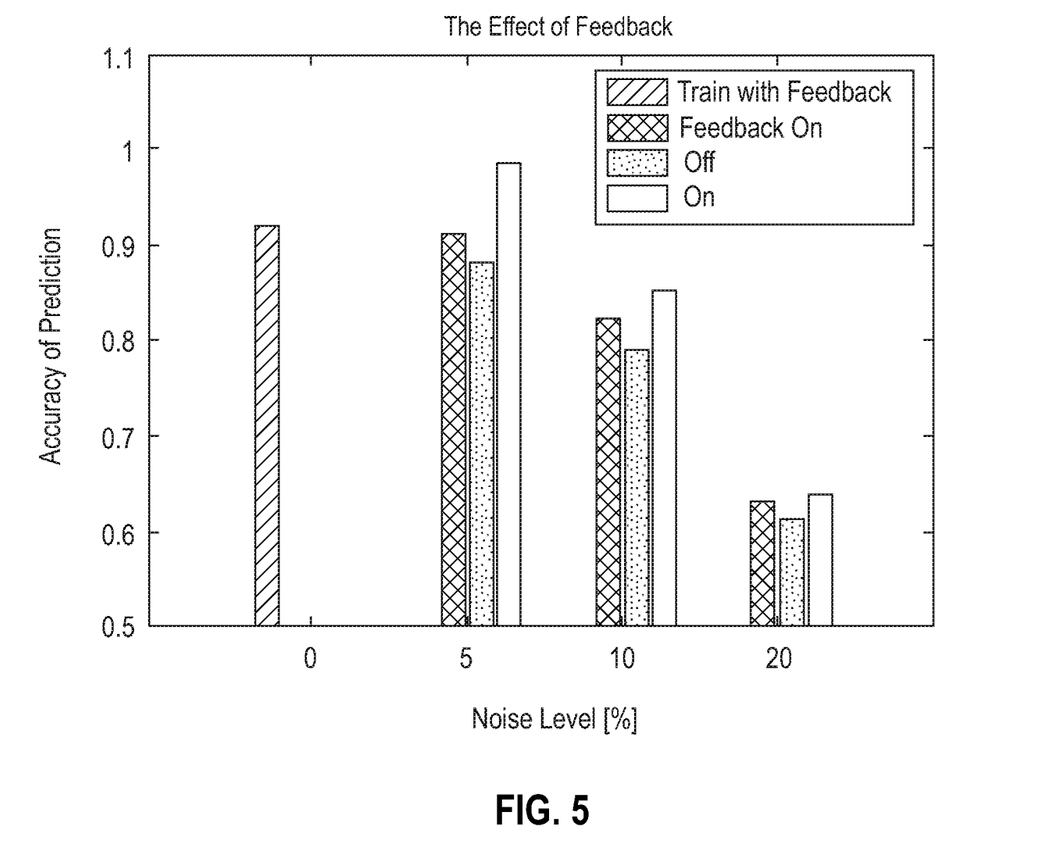
FIG. 5 is a graph of accuracy at various noise levels of exemplary embodiments of the present disclosure.

Referring to FIG. 5, exemplary results are illustrated. A simple binary neural network was simulated. It consisted of two regions: a lower one that received the encoded input data stream, and an upper one that received feed-forward input from the verified neurons in the sequence memory of the lower one. In this illustrative example, the input data consisted of three sentences, each about 45 characters long with integer (ASCII) encoding, selected in random order. Since there was only one input data stream, no pooling or correlation was necessary. The binary correlator was therefore replaced by a random sparcifier, an array of synapses with fixed strengths of one or zero. Each input character causes a set of L4 neurons to fire, and as the system learns all the sequences, a specific L2/3 neuron in the active columns is first predicted and subsequently verified. The axons of verified neurons connect to the basal dendrites of the L4' neurons in the upper region.

The upper region acts as a temporal correlator, pooling three consecutive inputs from the lower region and correlating them to generate new and increasingly stable representations of words and phrases in each sentence. In addition to the activation of the L2'/3' neurons, the L4' output is fed back to the apical dendrites of L4. The stability of the representation is assured by forming the logical AND of four successive outputs. If an L4 neuron receives apical feedback it enters its sustain state and fires at the next time step regardless of its basal activity. The maximum number of sustained neurons is the same as the number of active columns. If no sustained L4 neurons are activated bottom up, there will be twice the usual number of active columns. This maximum is enforced by automatically adjusting the overlap threshold of the apical dendrites.

In this example, the system was trained first on a dataset of length 10,000 characters, without noise, and with feedback as described. Three additional datasets were constructed using the same three sentences but randomly replacing 5%, 10%, or 20% of the characters. For each noise level, three runs were made, starting with the trained network, first with feedback still enabled, second with the feedback turned off, and last with the feedback restored. Synapse updates continued for all three runs. The behavior of the network was monitored using a learning metric that is zero when no correct predictions are being made, and rises to one when every prediction is correct. The metric is lower when there is noise in the input data, since the noise is unpredictable. The results are shown in FIG. 5. It will be appreciated that the feedback provided for herein improves the performance of the network for all noise levels.

Figure 6:
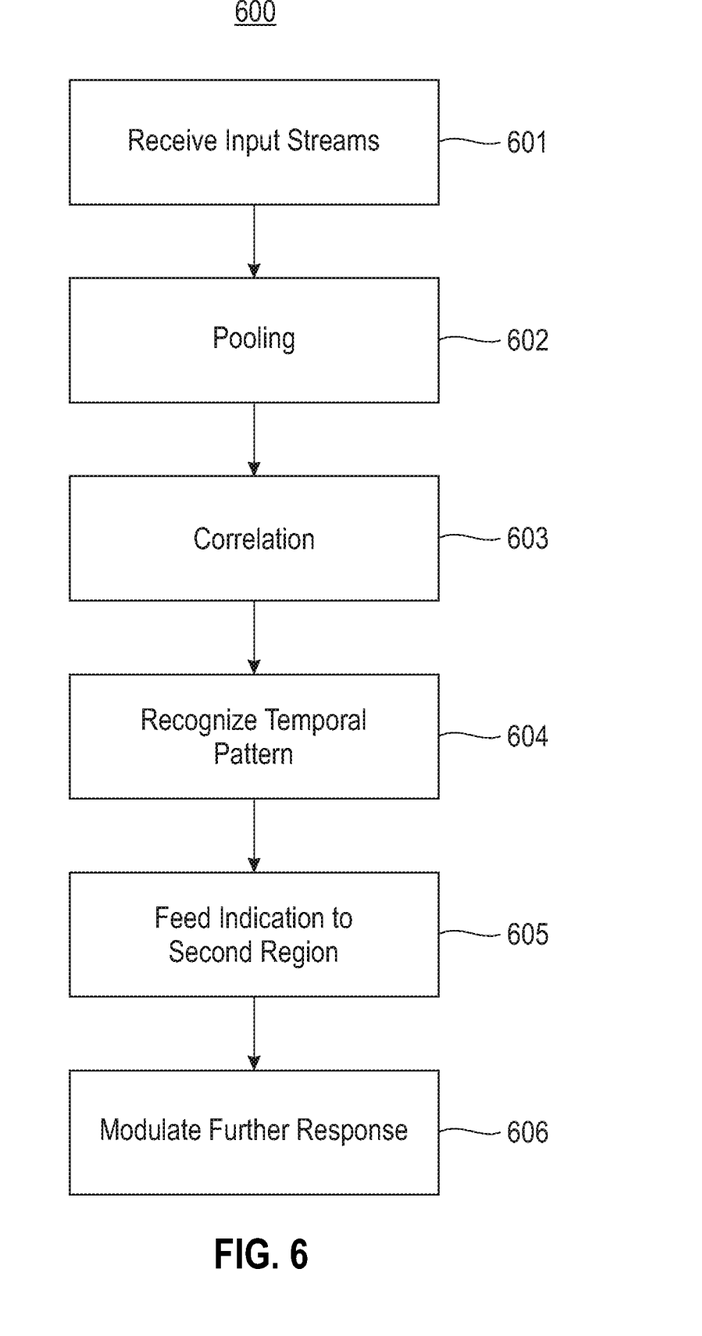
FIG. 6 illustrates a method for providing feedback within an artificial neural network according to embodiments of the present disclosure.

Referring now to FIG. 6, a method for providing feedback within an artificial neural network is illustrated according to embodiments of the present disclosure. At 601, a plurality of input streams is received at a first region of a hierarchical artificial neural network. At 602, the plurality of input streams is pooled in the first region. At 603, one or more recurrent features are identified in the pooled input streams in the first region. At 604, a temporal pattern is recognized in the one or more recurrent features in the first region. At 605, an indication of the temporal pattern is provided to at least a second region of the hierarchical neural network. The second region forms a stable representation. At 606, a response to a further input is modulated based on feedback from the second region and at least one additional region. The indications are based on a stable representation within the source region.

In general, hierarchical artificial neural networks according to the present disclosure may include a number of regions. Each region includes a pooler, a correlator, a sequence memory, and at least one connection to another region. In such embodiments, the pooler combines multiple input data streams fed forward from below. The correlator identifies recurrent features in the pooled input data. The sequence memory learns to recognize temporal patterns in the outputs of the correlator. Connections in the form of learning synapses feed upwards and downwards within the hierarchy of the neural network. A region can receive input fed back from multiple other regions in multiple higher levels of the hierarchy. This feedback can change the state of one or more neuron, thereby modulating the response to future inputs.

The output of the correlator may be fed back to one or more lower regions. The state of one or more neurons may be set to sustain, thus firing on the next time step, irrespective of whether bottom-up input alone would generate firing.

Figure 7:
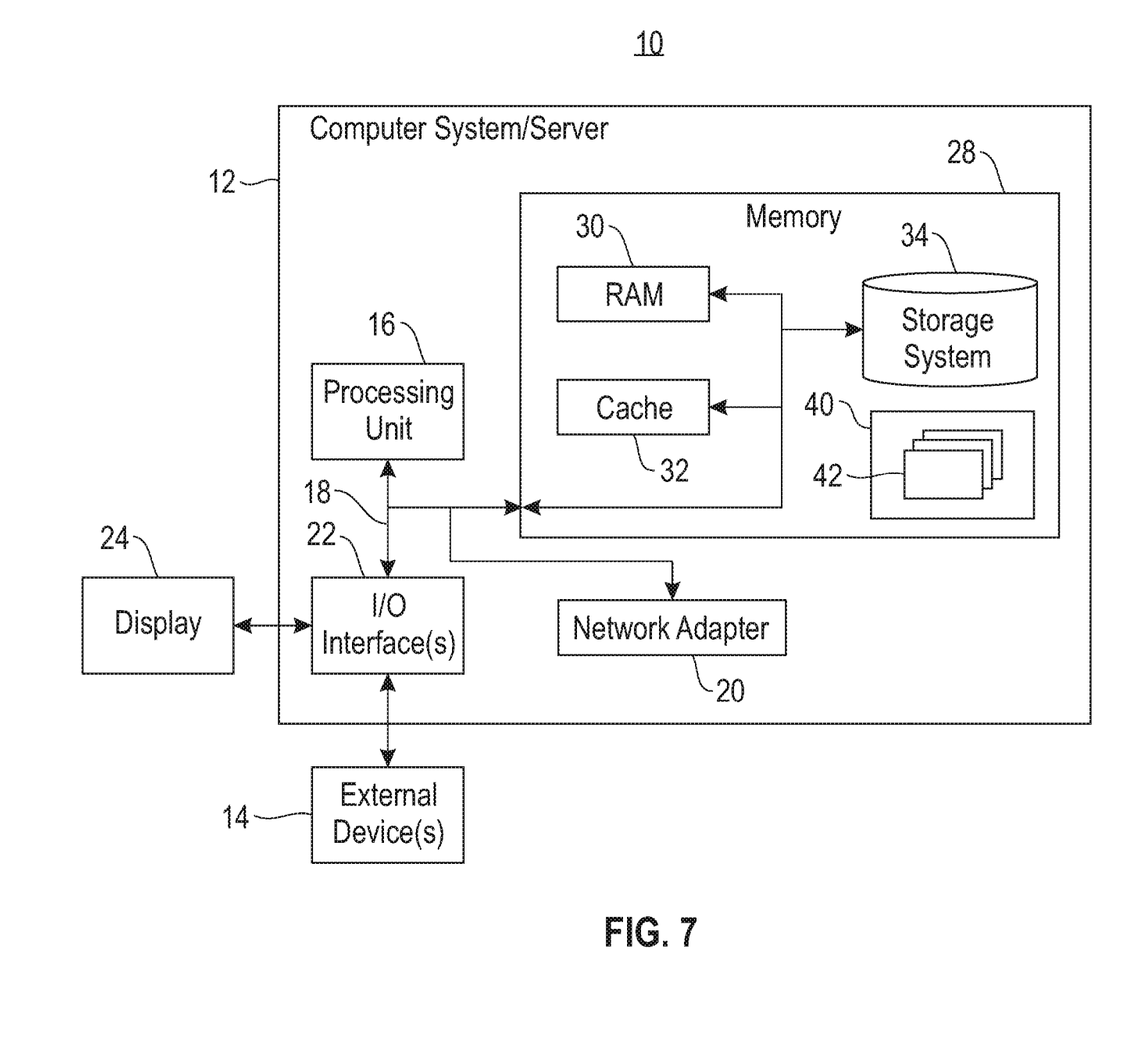
FIG. 7 depicts a computing node according to an embodiment of the present invention.

Referring now to FIG. 7, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying one or more recurrent features in an input stream in a first region of a hierarchical artificial neural network having a hierarchy;
   recognizing a temporal pattern in the one or more recurrent features in the first region;
   providing to at least a second region of the hierarchical neural network an indication of the temporal pattern;

based on the indication of the temporal pattern, forming a stable representation within the second region corresponding to a sequence within the input stream;
generating feedback in the second region based on the stable representation within the second region; and
modulating a response to a further input to the first region based on the feedback from the second region and at least one additional region, wherein the first region is directly below the second region within the hierarchy, the modulation comprising causing a neuron in the first region to fire irrespective of the further input, thereby sustaining the sequence corresponding to the stable representation despite noise in the input stream.

2. The method of claim 1, wherein the input stream is a pooled input stream, the method further comprising:
receiving a plurality of input streams at the first region; and
pooling the plurality of input streams to form the input stream in the first region.

3. The method of claim 1, wherein the stable representation is based on prior input to the hierarchical artificial neural network.

4. The method of claim 1, further comprising:
providing to at least a third region of the hierarchical neural network an indication of the one or more recurrent features.

5. The method of claim 1, wherein said providing the indication of the temporal pattern comprises activating one or more neurons in the second region.

6. The method of claim 1, wherein said recognizing the temporal pattern comprises applying a trained sequence memory.

7. The method of claim 6, further comprising training the sequence memory.

8. The method of claim 1, wherein the first region is located below the second region and the least one additional region within the hierarchy of the hierarchical artificial neural network.

9. The method of claim 1, wherein said modulating the response comprises sustaining the activity of one or more neurons in the first region.

10. A system, comprising:
a computing node comprising a computer readable storage medium having program instructions embodied therewith, the program instructions executable by a processor of the computing node to cause the processor to perform a method comprising:
receiving a plurality of input streams at a first region of a hierarchical artificial neural network having a hierarchy;
pooling the plurality of input streams in the first region;
identifying one or more recurrent features in the pooled input streams in the first region;
recognizing a temporal pattern in the one or more recurrent features in the first region;
providing to at least a second region of the hierarchical neural network an indication of the temporal pattern;
based on the indication of the temporal pattern, forming a stable representation within the second region corresponding to a sequence within the input stream;
generating feedback in the second region based on the stable representation within the second region; and
modulating a response to a further input to the first region based on the feedback from the second region and at least one additional region, wherein the first region is directly below the second region of the hierarchy, the modulation comprising causing a neuron in the first region to fire irrespective of the further input, thereby sustaining the sequence corresponding to the stable representation despite noise in the input stream.

11. A computer program product for providing feedback within an artificial neural network, the computer program product comprising a computer readable storage medium having program instructions embodied therewith, the program instructions executable by a processor to cause the processor to perform a method comprising:
receiving a plurality of input streams at a first region of a hierarchical artificial neural network having a hierarchy;
pooling the plurality of input streams in the first region;
identifying one or more recurrent features in the pooled input streams in the first region;
recognizing a temporal pattern in the one or more recurrent features in the first region;
providing to at least a second region of the hierarchical neural network an indication of the temporal pattern;
based on the indication of the temporal pattern, forming a stable representation within the second region corresponding to a sequence within the input stream;
generating feedback in the second region based on the stable representation within the second region; and
modulating a response to a further input to the first region based on the feedback from the second region and at least one additional region, wherein the first region is directly below the second region within the hierarchy, the modulation comprising causing a neuron in the first region to fire irrespective of the further input, thereby sustaining the sequence corresponding to the stable representation despite noise in the input stream.

12. A hierarchical artificial neural network implemented via at least one processor, comprising:
a plurality of regions, each region comprising a pooler, a correlator, a sequence memory, and at least one connection to another of the plurality of regions, the hierarchical artificial neural network having a hierarchy and being configured to:
receive a plurality of input streams at a first region of the plurality of regions;
pool the plurality of input streams at the pooler of the first region;
identify one or more recurrent features in the pooled input stream at the correlator of the first region;
recognize a temporal pattern in the one or more recurrent features at the sequence memory of the first region;
provide to at least a second region of the plurality of regions an indication of the temporal pattern;
based on the indication of the temporal pattern, form a stable representation within the second region corresponding to a sequence within the input stream;
generate feedback in the second region based on the stable representation within the second region; and
modulate a response to a further input to the first region based on the feedback from the second region and at least one additional region of the plurality of regions, wherein the first region is directly below the second region within the hierarchy, the modulation comprising causing a neuron in the first region to fire irrespective of the further input, thereby sustaining the sequence corresponding to the stable representation despite noise in the input stream.

13. The hierarchical artificial neural network of claim 12, wherein the stable representation is based on prior input to the hierarchical artificial neural network.

14. The hierarchical artificial neural network of claim 12, wherein said providing the indication of the temporal pattern comprises activating one or more neurons in the second region.

15. The hierarchical artificial neural network of claim 12, wherein said recognizing the temporal pattern comprises applying a trained sequence memory.

16. The hierarchical artificial neural network of claim 15, the hierarchical artificial neural network being further configured to train the sequence memory.

17. The hierarchical artificial neural network of claim 12, wherein the first region is located below the second region and the least one additional region within the hierarchy of the hierarchical artificial neural network.

18. The hierarchical artificial neural network of claim 12, wherein said modulating the response comprises sustaining the activity of one or more neurons in the first region.

19. A method, comprising:
 forming a stable representation within a second region of a hierarchical artificial neural network based on input to the hierarchical artificial neural network, the hierarchical artificial neural network having a hierarchy, and the stable representation corresponding to a sequence within the input;
 identifying one or more recurrent features in an input stream in a first region of the hierarchical artificial neural network;
 recognizing a temporal pattern in the one or more recurrent features in the first region;
 providing to at least a second region of the hierarchical neural network an indication of the temporal pattern;
 generating feedback in the second region based on the stable representation within the second region; and
 modulating a response to a further input to the first region based on the feedback from the second region and at least one additional region based on the stable representation, wherein the first region is directly below the second region within the hierarchy, the modulation comprising causing a neuron in the first region to fire irrespective of the further input, thereby sustaining the sequence corresponding to the stable representation despite noise in the input stream.

20. The method of claim 19, wherein the input stream is a pooled input stream, the method further comprising:
 receiving a plurality of input streams at the first region; and
 pooling the plurality of input streams to form the input stream in the first region.

21. The method of claim 19, wherein said recognizing the temporal pattern comprises applying a trained sequence memory.

22. The method of claim 19, wherein the first region is located below the second region and the least one additional region within the hierarchy of the hierarchical artificial neural network.

23. The method of claim 19, wherein said modulating the response comprises sustaining the activity of one or more neurons in the first region.

24. The method of claim 1, wherein the noise in the input stream comprises missing or erroneous data.

\* \* \* \* \*